United States Patent [19]

Hechenbleickner

[11] 3,919,165
[45] Nov. 11, 1975

[54] STABILIZED POLYVINYL CHLORIDE COMPOSITIONS

[75] Inventor: Ingenuin Hechenbleickner, West Cornwall, Conn.

[73] Assignee: Borg-Warner Corporation, Chicago, Ill.

[22] Filed: Aug. 14, 1974

[21] Appl. No.: 497,406

Related U.S. Application Data

[63] Continuation-in-part of Ser. No. 444,236, Feb. 20, 1974, abandoned, which is a continuation-in-part of Ser. No. 345,699, March 28, 1973, abandoned, which is a continuation-in-part of Ser. No. 186,509, Oct. 4, 1971, abandoned.

[52] U.S. Cl. ........ 260/45 K; 260/45.75 Z; 260/45.7; 260/45.85 H; 260/23 XA; 252/406
[51] Int. Cl.² .................................................... C08G 6/00
[58] Field of Search ............ 260/45.7 PS, 45.75 Z, 260/45.85 H, 23 XA, 45.75 K; 252/406

[56] References Cited
UNITED STATES PATENTS

| | | | |
|---|---|---|---|
| 2,592,926 | 4/1952 | Mack et al. | 260/45.75 |
| 2,597,920 | 5/1952 | Carroll | 260/45.75 |
| 2,623,892 | 12/1952 | Cleverdon et al. | 260/45.75 |
| 2,824,847 | 2/1958 | Fath | 260/45.7 |
| 3,021,302 | 2/1962 | Frey et al. | 260/45.75 |
| 3,692,879 | 9/1972 | Rattenbury et al. | 260/45.7 |

OTHER PUBLICATIONS
British Plastics, Vol. 30, pp. 183 to 186, 1957 (May).
SPE Transactions, Jan. 1962, pp. 28 to 31.

*Primary Examiner*—V. P. Hoke
*Attorney, Agent, or Firm*—Joseph Shekleton

[57] ABSTRACT

A stabilizer for polyvinyl chloride compositions comprising a hydrocarbon tin oxide, alkoxide, or a solution of a hydrocarbon tin oxide in a lower carboxylic acid ester, and an organic thiophosphorus compound. The stabilized compositions have increased color stability and good working properties.

12 Claims, No Drawings

STABILIZED POLYVINYL CHLORIDE COMPOSITIONS

RELATED APPLICATIONS

This application is a continuation-in-part of my co-pending application Ser. No. 444,236, filed Feb. 20, 1974, now abandoned which application in turn was a continuation-in-part of my earlier co-pending application Ser. No. 345,699, filed Mar. 28, 1973, and now abandoned, which application in turn was a continuation-in-part of my earlier co-pending application Ser. No. 186,509, filed Oct. 4, 1971 and also now abandoned.

BACKGROUND OF THE INVENTION

Numerous stabilizers have been described for polyvinyl chlorides, including tin compounds and thiophosphorus compounds. In one case, described in U.S. Pat. No. 2,824,847 (Fath), polyvinyl chloride is stabilized by the action of a mixture of a polyvalent metal soap and an organic thiophosphite. A typical combination includes a barium-cadmium laurate and tri (decylthio) phosphite. Color stability of the Fath stabilizers, where tin soaps are used as one component, leaves something to be desired on accelerated, high temperature, dynamic milling tests.

Color stability is important in a resin composition. So also are rheological properties, which are usually measured on a plastigraph such as a Brabender plastigraph. Odor is important. For example, dibutyl-tin bis-isooctyl thioglycolate, while it stabilizes against serious color degradation, unfortunately is characterized by a very disagreeable odor, which is often undesired in polyvinyl chloride plastics.

SUMMARY OF THE INVENTION

Improved polyvinyl chloride compositions are prepared in which the polyvinyl chloride is stabilized by combinations of chemicals of the type set out below. It should be understood that the present invention deals solely with stabilizers for the polyvinyl chloride. Other components in the composition, such as fillers, are either heat stable or, if requiring stabilization, use stabilizers other than those to which the present invention is directed. The stabilizing composition consists of a mixture of a tin compound and a thiophosphorus compound.

More particularly the stabilizing composition comprises (1) an organotin compound selected from the class consisting of $R_2SnO$, $RSnOOH$, polymers of said tin oxides, $RSn(OR')_3$ and $R_2Sn(OR')_2$ where R and R' are hydrocarbon groups having a 1–18 carbon atoms or two R' groups may consist of one alkylene group having 2–4 carbon atoms; and (2) a thiophosphorus compound selected from the class consisting of

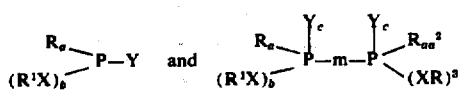

where

R, $R^1$, $R^2$ and $R^3$ are hydrocarbon groups having 1–18 carbon atoms, $(CH_2)_n COOR^4$, or hydrogen, with each phosphorus atom attached to no more than one hydrogen, $R^4$ is a hydrocarbon group having 1–12 carbon atoms, and $n$ is 1 or 2;

X and Y are oxygen or sulfur with at least one of them being sulfur;

$a$ and $b$ are 0 to 3, and $c$ is 0 to 1, the sum of $a$, $b$ and $c$ being consistent with a valence of 3 or 5 for phosphorus;

$m$ is sulfur, X $(CH_2)_p X$, or S $(CH_2)_p COOR OCO (CH_2)_p S$, $p$ is 1–10, and $R^5$ is a divalent hydrocarbon radical having 1–10 carbon atoms.

In the organotin compounds R and R' preferably are alkyl, more preferably lower alkyl, i.e., alkyl having 1–6 carbon atoms.

The thiophosphorus compound, in a preferred instance, is a trithiophosphite wherein the organic groups are $(CH_2)_n COOR^4$. Especially preferred are those trithiophosphites derived from isooctyl thioglycolate, alkyl thiolactates, thiopropionates and the like, i.e., by reaction with phosphorus trichloride. The various monovalent R groups, i.e., R, $R^1$, $R^2$, $R^3$ and $R^4$, in the above structural formula generally contain 6–22 carbon atoms, more usually 6–16 carbon atoms. $R^5$ preferably is a saturated aliphatic hydrocarbon radical although it may be aromatic or cycloaliphatic, e.g., phenylene or cyclohexylidene.

Illustrative examples of suitable tin compounds include the following: dimethyltin oxide, dibutyltin oxide, monobutyltin oxide, monobutyltin tributoxide, dibutyltin dibutoxide, monophenyltin oxide, phenylbutyltin oxide, diphenyltin oxide, diphenyltin dibutoxide, monooctyltin oxide, monooctyltin tributoxide and dioctyltin-1,2-propylene glycolate. The hydrocarbon tin oxide may be dissolved in a hydrocarbon ester of an oxygen-containing acid. Such ester solutions are described in U.S. Pat. No. 2,597,920 (Carroll) as reaction products of unknown composition. An illustrative example is prepared by heating one mole of dibutyltin oxide with one or more moles of isooctyl acetate; also, a heated mixture of one mole of dimethyltin oxide and ethyl butyrate. The tin compositions disclosed in the above Carroll patent are contemplated within the scope of the invention.

The following are typical phosphorus compounds: trilauryl trithiophosphite, trilauryl monothiophosphate, trioctyl dithiophosphonite, trioctyl trithiophosphite, trihexylthiophosphine, O,O,S-trihexyl thiophosphate, O,O,S-trioctyl dithiophosphate, tris-(butyl-2-mercaptopropionate) phosphite, tributyl tetraethyl pentathiophosphoric anhydride, O,O,O,O-tetrabutyl hexamethylene dithiodiphosphate, 2-phenoxy-1,-3-thiophospholate, 2-phenylthiol-1,3-oxaphosphorane trioctylphosphine sulfide, dilauryl thiophosphite, diphenylphosphine sulfide and a compound having the following structure.

The stabilized polyvinyl chloride compositions show greatly improved stability with respect to polyvinyl chloride compositions containing stabilizers using tin soaps and excellent rheological characteristics. The odor of the polyvinyl chloride compositions herein is also acceptable.

The polyvinyl chlorides, i.e., vinyl chloride polymers, or compositions containing them often with small percentages of other resins such as polymethylmethacrylate, are not changed by the present invention and usually contain other additives in small amounts, such as calcium stearate as a lubricant, waxes and the like. At least 25% of the resin constituents of the composition should be polyvinyl chloride, or if the vinyl chloride polymer is a copolymer then the vinyl chloride content of the copolymer should be such as to constitute at least about 25% of the resin content of the whole composition. The novelty of the present invention lies in the use of the combination of an organotin compound and a thiophosphorus compound as a polyvinyl chloride stabilizer and not in the use of any particular polyvinyl chloride or polymer of which vinyl chloride is a constituent. It should be noted that the present invention does not require any tin soaps and is entirely compatible with other soaps such as calcium stearates, which are used as lubricants. Also, it should be noted that the tin soaps are actual soaps, that is, the tin salts of various fatty acids.

The amount of stabilizer is not critical but, of course, must exceed minute traces. In general the tin compounds should be present in amounts of at least 0.125% of the polyvinyl chloride and the thiophosphorus compounds in comparable amounts, often substantially greater amounts. In general the percentages in each case, are preferably from about 0.3% to about 3%. Incorporation of the stabilizer components in the polyvinyl chloride composition is by conventional means, such as milling, and the present invention is not concerned with any new or particular method of making polyvinyl chloride compositions. This is an advantage as no new techniques need be learned by the polyvinyl chloride user.

A number of specific examples of polyvinyl chloride compositions were tested for color stability and some of them for rheological properties: the polyvinyl chloride compositions, except for the stabilizer, were maintained constant in all tests and, as is common in the art, contained about 1% of a lubricant, such as calcium stearate, and about 5% of polymethylmethacrylate, sold by the Rohm & Haas Company under the designation "K 120 N." This makes possible an exact comparison except that in some cases a small amount, about 0.5%, of a wax was present. As will appear from the more specific description below, none of these additional materials affect color stability, and so the invention is not limited in any way to the particular conventional additives used.

Color stability is tested by a very drastic accelerated test. One of these tests involving what is referred to as "dynamic milling," is carried out at 350°F. In 25 minutes results are obtained which otherwise would take many months of ordinary use. The other accelerated test is a static oven test in which a 20 mil sheet is cut into squares ½inch × ½inch, one such square sample of each film being placed on each of ten glass sheets. All samples then are placed in a forced draft oven at 350°F. and samples removed at 15-minute intervals. This is a very drastic test and after 150 minutes all of the sample films have developed an unacceptable color as defined below in connection with the dynamic milling. In the table following, of the examples which were tested only the results from the first 75 minutes are tabulated because, as stated above, if the time is extended sufficiently, unsatisfactory brown colors are invariably obtained. Therefore, differences between samples can only be determined practically in the first 75 minutes.

The color stability tests are so extremely drastic that only testing for 5 or 10 minutes has any practical direct relation to the stabilizing action on polyvinyl chloride compositions in actual use. Fifteen minutes is the extreme and is much more severe than any normal usage.

T-31 is a standard stabilizer which is an alkyltin thioglycolate.

DBTO in isooctyl acetate is prepared by heating dibutyltin oxide 25 parts and 38.8 parts of isooctyl acetate to obtain a homogeneous solution containing about 18% tin. Other alkyltin oxides can be dissolved in lower alkyl esters by the same procedure which is described in suitable detail in U.S. Pat. No. 2,597,920 (Carroll). In the tests used, which will be tabulated at the end of the specific examples below, the following color designations are used:

1 — Colorless
2 — Light Yellow
3 — Yellow
4 — Light Orange
5 — Orange
6 — Brown

A composition which after 25 minutes in the dynamic milling test rates 6 is completely unacceptable commercially. Even ratings of 4 and 5 represent unsatisfactory products. On the other hand, if after 25 minutes the color is 1 or 2, this indicates an extraordinarily good product. Even a rating of 3 still represents a useful and commercially acceptable product. In an occasional test, although the color stability is excellent, a - may indicate some sticking on the rolls. This does not mean that the product is not of excellent quality for ordinary use, but it was not possible to continue the dynamic milling test at the very high temperature. The stabilization test was carried out on a 6 × 12 Ferro mill with a roll speed of 52 fpm for the front roll and 39 fpm for the back roll, at a temperature of 350°F. The gap was one one-hundredth inch; chip size of the sample added to the rolls was two one-hundredth inch.

In order to avoid writing out the long chemical names of the tin and thiophosphorus compounds, the following abbreviations will be used—

DBTO — Dibutyltin oxide
MBTO — Monobutyltin oxide
K 120 N — Methylmethacrylate polymer
Wax 165 — Paraffin wax, m.p. 165°F.
ESO — Epoxidized soya oil
TLTP — Trilauryl trithiophosphite
MBTTB — Monobutyltin tributoxide
DBTD2EH — Dibutyltin di-2-ethyl hexoate
DBTDB — Dibutyltin dibutoxide
DBTOTG — Dibutyltin diisooctyl thioglycolate
TIDP — Triisodecyl phosphite
TLMTP — Trilauryl monothiophosphate
TOTGP — Tris (isooctyl thioglycolate) phosphite

TABLE 1

| | Dynamic Milling Test (350°F.) | | | | |
| --- | --- | --- | --- | --- | --- |
| | | Time in Minutes | | | |
| EXAMPLE | 5 | 10 | 15 | 20 | 25 |
| 1 | 1 | 3 | 4 | 5 | 6 |
| 2 | 1 | 3 | 4 | 5 | 6 |
| 3 | 1 | 2 | 2 | 2 | 2 |
| 4 | 1 | 1 | 1 | 2 | 2 |
| 5 | 1 | 2 | 2 | 2 | 2 |
| 6 | 1 | 1 | 2 | 2 | 2 |
| 7 | 1 | 1 | 2 | 2 | 2 |
| 8 | 1 | 3 | 4 | 5 | 6 |
| 9 | 1 | 3 | 3 | 3 | 3 |
| 10 | 1 | 3 | 3 | 3 | 3 |
| 11 | 1 | 3 | 3 | 3 | 3 |

TABLE 1-continued

Dynamic Milling Test (350°F.)
Time in Minutes

| EXAMPLE | 5 | 10 | 15 | 20 | 25 |
|---|---|---|---|---|---|
| 12 | 1 | 1 | 1 | 2 | 2 |
| 13 | 1 | 1 | 1 | 2 | 2 |
| 14 | 1 | 1 | 1 | 2 | 2 |
| 15 | 1 | 1 | 1 | 2 | — |
| 16 | 1 | 1 | 1 | 1 | 2 |
| 17 | 1 | 2 | 2 | 2 | 2 |
| 18 | 1 | 2 | 2 | 2 | 2 |
| 19 | 1 | 1 | 2 | 2 | 2 |
| 20 | 1 | 2 | 3 | 3 | 3 |
| 21 | 1 | 3 | 3 | 3 | 3 |

A second test was made comparing 0.56 parts (per 100 parts of polyvinyl chloride) of dibutyltin oxide with the same amount of dibutyltin oxide and varying additional amounts of TOTGP and also with a commercial stabilizer dibutyltin bis-(isooctylmercapto) acetate, which is customarily referred to as T-31, in an amount larger than that in which it is normally used. The following table shows the various compositions. The tests were carried out over a period of 15 minutes (dynamic milling), and the results are set forth in the Table 3, the figures having the same significance as in Table 1. It will be noted that the formulations numbered 2, 3 and 4 show colorless polyvinyl chloride after 5 minutes and light yellow after 15 minutes. The The sample containing commercial stabilizer T-31 is yellow at 5 minutes. Dibutyltin oxide yellows at 5 minutes, becomes orange to brown at 10, and dark brown at 15 minutes; in other words after 10 minutes the color is completely commercially unacceptable. Formulation number 4 corresponds to Example 22.

TABLE 2

| FORMULATION | 1 | 2 | 3 | 4 | 5 |
|---|---|---|---|---|---|
| | Parts by Weight | | | | |
| PVC Resin | 100.0 | 100.0 | 100.0 | 100.0 | 100.0 |
| CaStearate | 1.0 | 1.0 | 1.0 | 1.0 | 1.0 |
| Wax | 0.25 | 0.25 | 0.25 | 0.25 | 0.25 |
| K-120-N | 5.0 | 5.0 | 5.0 | 5.0 | 5.0 |
| DBTO | 0.56 | 0.56 | 0.56 | 0.56 | — |
| TOTGP | — | 0.096 | 0.192 | 0.38 | — |
| T-31* | — | — | — | 1.44 | — |

*T-31 contains no DBTO

TABLE 3

COLOR STABILIZATION TEST
Dynamic Milling Test 350°F.
Time in Minutes

| FORMULATION | 5 | 10 | 15 |
|---|---|---|---|
| 1 | 2 | 5 | 6 |
| 2 | 1 | 2 | 2 |
| 3 | 1 | 2 | 2 |
| 4 | 1 | 2 | 2 |
| 5 | 2 | 2 | 2 |

DESCRIPTION OF THE PREFERRED EMBODIMENTS

In all of the examples the polyvinyl chloride (or "PVC Resin") is a product sold by the Panasote Company under its designation Panasote 651. This resin had an intrinsic viscosity of 2.28 and an approximate K value of 65. In the following examples this will be designated "PVC 651." In all of the examples the ingredients were mixed, heated, and formed into chips of 0.02 inch. Examples 1, 2 and 8 represent typical prior art examples; Examples 1 and 2 describe compositions which contain no thiophosphorus compounds and Examples 2 and 8 describe compositions which contain tin soaps but no tin compound of the type contemplated herein. It will be noted, moreover, that each of these three compositions (of the prior art) do contain calcium stearate. All parts herein are by weight.

EXAMPLE 1

| | Parts |
|---|---|
| PVC | 100 |
| CaSt | 1.0 |
| DBTO | 0.56 |
| TIDP | 0.56 |
| Wax 165 | 0.25 |
| K 120 N | 5.0 |

EXAMPLE 2

| PVC 651 | 100 |
|---|---|
| CaSt | 1.0 |
| DBTD2EH | 1.11 |
| TIDP | 1.11 |
| K 120 N | 5.00 |

EXAMPLE 3

| PVC 651 | 100 |
|---|---|
| DBTO | 0.56 |
| TLTP | 0.66 |
| CaSt | 1.00 |
| K 120 N | 5.00 |

EXAMPLE 4

| PVC 651 | 100 |
|---|---|
| MBTTB | 0.61 |
| TLTP | 1.45 |
| CaSt | 1.00 |
| K 120 N | 5.00 |

EXAMPLE 5

| PVC 651 | 100 |
|---|---|
| DBTDB | 0.69 |
| TLTP | 1.17 |
| CaSt | 1.00 |
| K 120 N | 5.00 |

EXAMPLE 6

| PVC 651 | 100 |
|---|---|
| MBTO | 0.47 |
| TLTP | 1.41 |
| Wax 165 | 0.50 |
| CaSt | 1.00 |
| K 120 N | 5.00 |

EXAMPLE 7

| PVC 651 | 100 |
|---|---|
| DBTO | 0.56 |
| TLTP | 0.66 |
| CaSt | 1.00 |
| K 120 N | 5.00 |
| Weston 618 | 0.25 |

EXAMPLE 8

| PVC 651 | 100 |
|---|---|
| DBTD2EH | 0.75 |
| TLTP | 0.97 |
| CaSt | 1.00 |
| K 120 N | 5.00 |

EXAMPLE 9

| PVC 651 | 100 |
|---|---|
| DBTO | 0.56 |
| TLMTP | 1.40 |
| CaSt | 1.00 |
| K 120 N | 5.00 |

EXAMPLE 10

| PVC 651 | 100 |
|---|---|
| DBTO | 0.84 |
| TLTP | 0.67 |
| CaSt | 1.00 |
| K 120 N | 5.00 |

EXAMPLE 11

| | |
|---|---|
| PVC 651 | 100 |
| DBTO | 0.67 |
| TLTP | 0.67 |
| CaSt | 1.00 |
| K 120 N | 5.00 |

EXAMPLE 12

| | |
|---|---|
| PVC 651 | 100 |
| MBTTB | 0.61 |
| TLTP | 1.45 |
| CaSt | 1.00 |
| K 120 N | 5.00 |

EXAMPLE 13

| | |
|---|---|
| PVC 651 | 100 |
| MBTTB | 0.91 |
| TLTP | 1.45 |
| CaSt | 1.00 |
| K 120 N | 5.00 |

EXAMPLE 14

| | |
|---|---|
| PVC 651 | 100 |
| MBTTB | 0.73 |
| TLTP | 1.45 |
| CaSt | 1.00 |
| K 120 N | 5.00 |

EXAMPLE 15

| | |
|---|---|
| PVC 651 | 100 |
| MBTO | 0.56 |
| TLTP | 1.70 |
| Wax 165 | 0.40 |
| CaSt | 1.00 |
| K 120 N | 5.00 |

EXAMPLE 16

| | |
|---|---|
| PVC 651 | 100 |
| MBTO | 0.70 |
| TLTP | 1.40 |
| Wax 165 | 0.40 |
| CaSt | 1.00 |
| K 120 N | 5.00 |

EXAMPLE 17

| | |
|---|---|
| PVC 651 | 100 |
| DBTDB | 1.03 |
| TLTP | 1.17 |
| CaSt | 1.00 |
| K 120 N | 5.00 |

EXAMPLE 18

| | |
|---|---|
| PVC 651 | 100 |
| DBTDB | 0.83 |
| TLTP | 1.17 |
| CaSt | 1.00 |
| K 120 N | 5.00 |

EXAMPLE 19

| | |
|---|---|
| PVC 651 | 100 |
| MBTO | 0.47 |
| TLTP | 1.41 |
| Wax 165 | 0.50 |
| CaSt | 1.00 |
| K 120 N | 5.00 |
| ESO | 1.00 |

EXAMPLE 20

| | |
|---|---|
| PVC 651 | 100 |
| DBTO | 0.56 |
| TLTP | 0.66 |
| CaSt | 1.00 |
| K 120 N | 5.00 |
| ESO | 1.00 |

EXAMPLE 21

| | |
|---|---|
| PVC 651 | 100 |
| DBTDB | 0.86 |
| TLMTP | 1.46 |
| CaSt | 1.00 |
| K 120 N | 5.00 |

EXAMPLE 22

| | |
|---|---|
| PVC Resin | 100 |
| CaSt | 1.0 |
| Wax 165 | 0.25 |
| K 120 N | 5.0 |
| DBTO | 0.56 |
| TOTGP | 0.38 |

The products of the examples were tested for stabilization against color by dynamic milling at 350°F as described above. It will be seen that the prior art Examples 1, 2 and 8 developed a color rating of 6 in 25 minutes and are thus not commercially acceptable. DBTO (Formulation 1 in Tables 2 and 3) alone develops a color rating of 6 at 15 minutes. All of the other examples developed color ratings no worse than 3 after 25 minutes and most of them scored better and so were shown to be excellent products. In the case of Example 15, while the color stabilization was excellent up to 20 minutes, it was not possible to evaluate the color at 25 minutes because the material stuck to the rolls.

A number of the examples were tested on a Brabender Plastigraph and all were acceptable. The Following table sets forth the results:

TABLE 4

| Example | Fusion Time | Stabilization Time | °C. Stock Temperature |
|---|---|---|---|
| 1 | 1.9 | 4.7 | 195 |
| 2 | 1.5 | 6.3 | 196 |
| 3 | 1.7 | 5.7 | 196 |
| 4 | 1.1 | 4.7 | 195 |
| 5 | 1.0 | 4.8 | 193 |
| 6 | 0.7 | 6.2 | 193 |
| 7 | 1.5 | 5.7 | 199 |
| 8 | 0.7 | 5.4 | 195 |
| 9 | 0.9 | 5.3 | 198 |
| 14 | 2.8 | 5.0 | 196 |
| 15 | 0.4 | 5.0 | 194 |
| 16 | 2.3 | 5.4 | 197 |
| 17 | 1.4 | 4.6 | 197 |
| 18 | 1.4 | 4.4 | 195 |
| 20 | 1.6 | 4.7 | 198 |
| 21 | 1.9 | 7.2 | 195 |
| 22 | 0.7 | 5.5 | 196 |

Some additional test pieces were prepared, as follows, and were tested by the static oven method which has been described above.

EXAMPLE 23

| | Parts |
|---|---|
| DBTO in isooctyl acetate | 1.5 |
| Tris (butyl-3-mercaptopropionate) phosphite | 0.5 |

EXAMPLE 24

| | |
|---|---|
| Dibutyltin propylene glycolate | 0.7 |
| O,O,O,O-tetrahexyl hexamethylene dithiodiphosphite | 0.5 |

EXAMPLE 25

| | |
|---|---|
| Diphenyltin oxide | 0.7 |
| Phenylethylene dithiophosphite | 0.5 |

EXAMPLE 26

| | |
|---|---|
| Dibutyltin diphenoxide | 1.0 |
| Tris (butyl-3-mercaptopropionate) phosphite | 0.5 |

The following table sets forth the static oven test, extending only to 75 minutes because, as has been stated above, the test is so severe that a color rating of 6 is produced in any sample tested for at least 150 minutes.

| Static Oven Test Conditions: | | 20-mil sheet cut into ½ × ½" squares. One sample of each film placed on each of 10 glass sheets. All samples placed in a forced draft oven at 350°F. and samples removed at 15-minute intervals. | | | | | |
|---|---|---|---|---|---|---|---|
| Basic Formulation: | | PVC 651, 100; Ca stearate, 1.0; Wax 165, 0.25; K-120-N, 5.0 | | | | | |
| | | | | | Time in Minutes | | |
| Example | | Parts | P-S Additive | Parts | 0 | 30 | 60 | 75 |
| 23 | DBTO in isooctyl acetate | 1.5 | Tris (butyl-3-mercaptopropionate) phosphite | 0.5 | 1 | 1 | 2 | 2 |
| 24 | Bu$_2$Sn propylene glycolate | 0.7 | 0,0,0,0-tetrahexyl hexamethylene dithiodiphosphite | 0.5 | 1 | 1 | 2 | 2 |
| 25 | Diphenyltin oxide | 0.7 | Phenylethylene dithiophosphite | 0.5 | 2 | 2 | 3 | 3 |
| 26 | Bu$_2$Sn diphenoxide | 1.0 | Tris (butyl-3-mercaptopropionate) phosphite | 0.5 | 1 | 1 | 2 | 2 |

It is well understood in the art that the organotin oxides herein generally exist as polymers of varying molecular weight. The terminology used in the specification and claims to designate the organotin compounds is used in that sense, i.e., to include the well-known polymers of the organotin oxides.

It will be noted that the amount of stabilizers is quite small and is based on the polyvinyl chloride content of the composition. The amounts of other constituents such as fillers, e.g., talc, vary depending on the use to which the vinyl composition is to be put. The present invention is not concerned with stabilization of these other constituents, which in some cases may amount to a large portion of the total composition. The present invention is directed solely to stabilizers for the polyvinyl chloride itself; when other components are present they are either heat-stable, which is true for most fillers, or if they require stabilization against heat degradation other types of stabilizers are used. The other components are not affected by the stabilization of the polyvinyl chloride, and where in some few cases it is known that they require stabilizers, conventional materials are used. The present invention deals exclusively with a new solution for the stabilization of polyvinyl chloride itself.

I claim:

1. A composition of matter suitable for stabilizing vinyl chloride polymers comprising (1) 0.125 –3 parts an organotin compound selected from the class consisting of R$_2$ SnO, R Sn OOH, polymers of said tin oxides, R Sn (OR')$_3$ and R$_2$Sn(OR')$_2$ where R and R' are hydrocarbon groups having 1–18 carbon atoms or two R groups may consist of one alkylene group having 2–4 carbon atoms, and (2) 0.125 –3 parts a thiophosphorus compound selected from the class consisting of

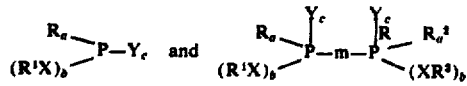

where
R, R$^1$, R$^2$ and R$^3$ are hydrocarbon groups having 1–18 carbon atoms, (CH$_2$)$_n$COOR$^4$, or hydrogen, with each phosphorus atom attached to no more than one hydrogen, R$^4$ is a hydrocarbon group having 1–12 carbon atoms, and $n$ is 1 or 2;
X and Y are oxygen or sulfur with at least one of them being sulfur;

$a$ and $b$ are 0 to 3, and $c$ is 0 to 1, the sum of $a$, $b$ and $c$ being consistent with a valence of 3 or 5 for phosphorus;
$m$ is sulfur, X — CH$_2$)$_p$X, or S CH$_2$)$_p$COOR$^5$OCO — CH$_2$)$_p$S, $p$ is 1–10, and R$^5$ is a divalent hydrocarbon radical having 1–10 carbon atoms.

2. The composition of claim 1 wherein the organotin compound is an organotin oxide or polymer thereof.

3. The composition of claim 1 wherein the organotin compound is an organotin alkoxide.

4. The composition of claim 1 wherein the organotin compound is R$_2$SnO or a polymer thereof wherein R is alkyl.

5. The composition of claim 1 wherein the thiophosphorus compound is a thiophosphite or a thiophosphate.

6. The composition of claim 1 wherein the thiophosphorus compound is a trithiophosphite.

7. The composition of claim 1 wherein the thiophosphorus compound is a trithiophosphite where the organic groups are alkyl.

8. The composition of claim 7 wherein the alkyl groups contain 6–22 carbon atoms.

9. A vinyl chloride polymer composition containing an amount of a vinyl chloride polymer sufficient to provide vinyl chloride units corresponding to at least about 25% of the resin content, and minor amounts, sufficient to stabilize said vinyl chloride polymer against thermal degradation, of each of the organotin compound and the thiophosphorus compound of claim 1.

10. The vinyl chloride polymer of claim 9 wherein the amounts of organotin compound and thiophosphorus compound are each from about 0.125% to about 3%, based on the amount of vinyl chloride in the vinyl chloride polymer.

11. A vinyl chloride polymer composition containing an amount of a vinyl chloride polymer sufficient to provide vinyl chloride units corresponding to at least about 25% of the resin content, and minor amounts, sufficient to stabilize said vinyl chloride polymer against thermal degradation, of each of the organotin compound and the thiophosphorus compound of claim 4.

12. A vinyl chloride polymer composition containing an amount of a vinyl chloride polymer sufficient to provide vinyl chloride units corresponding to at least about 25% of the resin content, and minor amounts, sufficient to stabilize said vinyl chloride polymer against thermal degradation, of each of the organotin compound and the thiophosphorus compound of claim 8.

* * * * *